United States Patent
Nagel et al.

(10) Patent No.: US 12,411,113 B2
(45) Date of Patent: Sep. 9, 2025

(54) MULTILAYER BOLTHOLE NONDESTRUCTIVE INSPECTION (NDI)

(71) Applicant: Texas Research International, Inc., Austin, TX (US)

(72) Inventors: John Nagel, Austin, TX (US); Mark Warchol, Austin, TX (US); David Forsyth, Austin, TX (US); Ajay Shah, Austin, TX (US)

(73) Assignee: TEXAS RESEARCH INTERNATIONAL, INC., Austin, TX (US)

(*) Notice: Subject to any disclaimer, the term of this patent is extended or adjusted under 35 U.S.C. 154(b) by 158 days.

(21) Appl. No.: 17/966,872

(22) Filed: Oct. 16, 2022

(65) Prior Publication Data

US 2023/0123998 A1 Apr. 20, 2023

Related U.S. Application Data

(60) Provisional application No. 63/257,089, filed on Oct. 18, 2021.

(51) Int. Cl.
*G01N 29/265* (2006.01)
*G01N 29/06* (2006.01)
(Continued)

(52) U.S. Cl.
CPC ........... *G01N 29/265* (2013.01); *G01N 29/06* (2013.01); *G01N 29/226* (2013.01);
(Continued)

(58) Field of Classification Search
CPC .... G01N 29/265; G01N 29/06; G01N 29/226; G01N 29/2487; G01N 229/0289; G01N 229/2691
(Continued)

(56) References Cited

U.S. PATENT DOCUMENTS 6,014,896 A * 1/2000 Schoess ................. G01N 29/42
73/583
7,398,698 B2 * 7/2008 Griess .................. G01N 29/045
73/801
(Continued)

FOREIGN PATENT DOCUMENTS

CA 2619156 A1 * 2/2007 ........... G01N 29/226
CN 111257433 A * 6/2020
(Continued)

OTHER PUBLICATIONS

Avdelidis et al., Infrared thermography inspection of glass reinforced plastic (GRP) wind turbine blades and the concept of an automated scanning device, 2010 IEEE Conference on Robotics, Automation and Mechatronics, pp. 557-562 (Year: 2010).*

Ley et al., Line scanning thermography and its application inspecting aerospace composites, 5th International Symposium on NDT in Aerospace, Nov. 13-15, 2013, Singapore (Year: 2013).*

(Continued)

*Primary Examiner* — Stephanie E Bloss
*Assistant Examiner* — Kevin C Butler
(74) *Attorney, Agent, or Firm* — Jackson Walker LLP

(57) ABSTRACT

The use of nondestructive inspection (NDI) capabilities for the detection of fatigue cracks extending from fastener holes in multi-layered metallic structures without removing the fastener; including at least the use of a probe guide containing a UT sensor and either an inertial measurement unit (IMU) or a rotary encoder, and either of these options could be applied in testing of either raised head fasteners or flush fasteners.

7 Claims, 11 Drawing Sheets

(51) Int. Cl.
*G01N 29/22* (2006.01)
*G01N 29/24* (2006.01)

(52) U.S. Cl.
CPC . *G01N 29/2487* (2013.01); *G01N 2291/0289* (2013.01); *G01N 2291/2691* (2013.01)

(58) Field of Classification Search
USPC .......................................................... 73/620
See application file for complete search history.

(56) References Cited

U.S. PATENT DOCUMENTS

| | | | | |
|---|---|---|---|---|
| 7,478,569 | B2* | 1/2009 | Bossi | G01N 29/2475 |
| | | | | 73/625 |
| 9,976,988 | B2* | 5/2018 | Kollgaard | G01N 29/07 |
| 10,267,771 | B2* | 4/2019 | Tissenier | G01N 29/48 |
| 2007/0039390 | A1* | 2/2007 | Duncan | G01N 29/265 |
| | | | | 73/606 |
| 2016/0377578 | A1* | 12/2016 | Landy | G01N 29/043 |
| | | | | 73/618 |
| 2017/0032281 | A1* | 2/2017 | Hsu | G05B 19/41875 |
| 2017/0038341 | A1* | 2/2017 | Pember | G01N 29/0609 |
| 2017/0307569 | A1* | 10/2017 | Tissenier | G01N 29/225 |
| 2018/0067484 | A1* | 3/2018 | Troy | G01S 17/88 |
| 2018/0217107 | A1* | 8/2018 | Landy | G01N 29/043 |
| 2020/0225192 | A1* | 7/2020 | Wei | G01N 29/265 |
| 2022/0341885 | A1* | 10/2022 | Badeau | G01N 29/265 |
| 2023/0123998 | A1* | 4/2023 | Nagel | G01N 29/043 |
| | | | | 73/620 |

FOREIGN PATENT DOCUMENTS

| | | | | |
|---|---|---|---|---|
| CN | 111289617 A | * | 6/2020 | |
| CN | 112611808 A | * | 4/2021 | ........... G01N 29/265 |
| CN | 107917953 B | * | 7/2021 | ............. G01N 27/84 |
| EP | 1918698 A1 | * | 5/2008 | ............. G01N 23/04 |
| JP | 2007512529 A | * | 5/2007 | ............. G01M 99/00 |
| KR | 20130137109 A | * | 12/2013 | ................ B25J 9/06 |
| KR | 102672202 B1 | * | 6/2024 | ........... G01N 29/22 |
| WO | WO-2024052847 A1 | * | 3/2024 | ............. F16L 55/40 |

OTHER PUBLICATIONS

Janovec et al., 13th International Scientific Conference on Sustainable, Modern and Safe Transport (TRANSCOM 2019), High Tatras, Novy Smokovec—Grand Hotel Bellevue, Inspection of Zlin 142 Fuselage (Year: 2019).*

Minhhuy Le et al., Ultrasonic testing of rivet in multilayer structure using a convolutional neural network on edge device, Science Progress 2023, vol. 106(2) 1-20 (Year: 2023).*

Hsu et al., Nondestructive Evaluation of Repairs on Aircraft Composite Structures, Nondestructive Evaluation of Materials and Composites V, Proceedings of SPIE vol. 4336 (2001) (Year: 2001).*

Bamard et al., NDE of Bonded Aluminum Components on Aircraft Structures, AIP Conf. Proc. 975, 988-994 (2008) (Year: 2008).*

Shao et al., Automatic Detection and Imaging of Rivet Hole Defects for Aircraft Structures With Optimized Sensor Array Using Eddy Current Method and Image Analysis, IEEE Sensors Journal, vol. 23, No. 5, Mar. 1, 2023 (Year: 2023).*

Blanloeuil et al., Development of benchmark composite panels for ARH and MRF rotary wings platforms Non-Destructive Inspection, 20th Australian International Aerospace Congress, Feb. 27-28, 2023, Melbourne (Year: 2023).*

* cited by examiner

MULTILAYER BOLTHOLE NONDESTRUCTIVE INSPECTION (NDI)

CROSS REFERENCE

Priority is claimed from U.S. application 63/257,089 filed Oct. 18, 2021, which is hereby incorporated by reference.

FIELD

This disclosure relates to the use of nondestructive inspection (NDI) capabilities for the detection of fatigue cracks extending from fastener holes in multi-layered metallic structures without removing the fastener.

BACKGROUND

An important issue in the reliability and safety of aircraft is the development of fatigue cracks extending from fastener holes in multi-layered metallic aircraft structures. This disclosure will examine the detection of fatigue cracks extending from fastener holes in multi-layered metallic structures with the wingbox or wing carry through (WCT) structure and skin of an aircraft as an example.

Assessment of integrity of engineering components and structures is becoming increasingly important for both economic and safety reasons. It is now widely accepted that all components and structures possess "defects" from the start of their service life (this forms an important and initial assumption in fracture mechanics) and that defect assessment is the way to control structural integrity reliably. Defects are those anomalies which when not removed or repaired might lead to an ultimate loss of structural integrity of the material or component. Such defects include surface and sub-surface cracks, inclusions, pores, incompletely joined regions in welds or other joints and residual stresses, macro- or microstructural degradations etc. in metallic materials and delaminated or debonded regions, fiber fracture, matrix crazing etc. in composites. While surface defects are of immediate concern, due consideration is also to be given to sub-surface defects and other anomalies. In either case, it is important to understand the factors that govern the likely growth over time of defects/anomalies or cracks originating from them. In particular, the size of the defect, its nature, its location, the stress to which it is subjected and the local properties of the material in which it is embedded, all play a major role in determining its rate of growth. According to fracture mechanics, defects present in materials lead to failure by growing to a critical size.

Of particular interest in this disclosure are the detection and monitoring of fatigue cracks extending from fastener holes in multilayered metallic aircraft structures such as those found in the wingbox or skin and support structures of aircraft.

There are other NDI options for the inspection of fastener sites, the most prominent being automated bolt-hole eddy current (BHEC). However, this requires the removal of the fastener, which is a labor intensive and costly process when done across a large structure with potentially hundreds or thousands of fasteners. Fastener removal also risks damaging the fastener hole when no damage was there previously.

There is a need then for an ultrasonic phased array inspection method that would allow for the fastener to stay in place during inspection.

To maximize the signal that is reflected from a fatigue crack at a certain depth (specific layer) or around a specific sized fastener, the UT transducer needs to be located a specific location on the surface of the part. A fatigue crack can also be located at any direction (360° rotation) around the fastener. In order to help inspectors locate the fatigue cracks and provide feedback at what angle the crack is located, we disclose a a probe housing to automatically provide an inspector with the position at the correct location relative to the fastener and provide feedback about what angle the probe is currently at relative to a starting location.

There is a need then to develop nondestructive inspection (NDI) capabilities for the detection of fatigue cracks extending from fastener holes in multi-layered metallic structures without removing the fastener. There may be two different types of these structures, one with raised head fasteners (usually internal) and one with flush fasteners.

BRIEF SUMMARY

Figure 1:
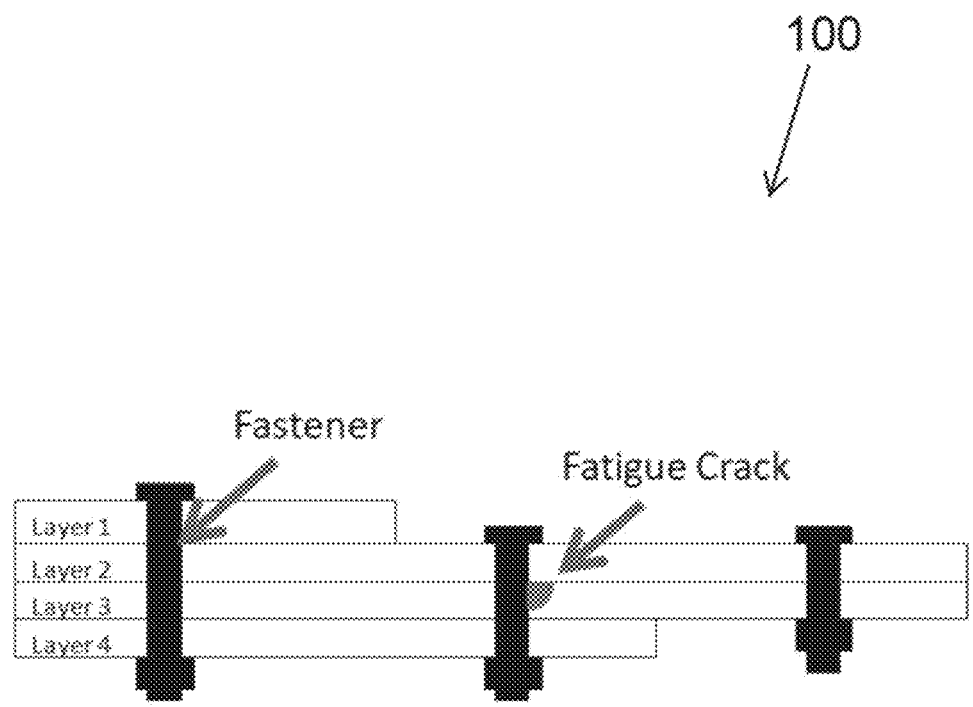
FIG. 1 is an example schematic of raised head fasteners in a multilayered wing structure with a fatigue crack.

This description proposes a method for detecting fatigue cracks extending from fastener holes in multilayer metallic structures without removing the fasteners and it includes at least the steps of: providing a probe guide to be used by a human inspector; wherein the probe guide would include an ultrasonic testing (UT) sensor; and the probe guide can be used by the human inspector to locate the ultrasonic testing sensor at specific desired locations on the surface of the multilayer metallic structures.

The method can be applied to structures in which the fasteners have raised fastener heads and the probe guide can be positioned against desired raised fastener heads and rotated around the fastener head by the human inspector and the probe guide contains an inertial measurement unit (IMU) that can provide the human inspector with information on the position and angle of the probe guide as well as readings from the ultrasonic signal as the probe guide is rotated around the raised fastener head.

The method can be applied to structures in which the fasteners have raised fastener heads and the probe guide can be positioned against desired raised fastener heads and rotated around the fastener head by the human inspector and the probe guide contains a rotary encoder that can provide the human inspector with information and/or displays on the position and angle of the probe guide as well as readings form the ultrasonic signal as the probe guide is rotated around the raised fastener head.

The method can be applied to structures have flush fastener heads and the probe guide can be positioned directly over the desired flush fastener head and rotated by the human inspector; and wherein the probe guide contains an inertial measurement unit (IMU) that can provide the human inspector with information and/or displays of the position and angle of the probe as well as the ultrasonic signal as the probe is rotated around the flush fastener heads.

The method can be applied to structures that have flush fastener heads and the probe guide can be positioned directly over the desired flush fastener head and rotated by the human inspector; and the probe guide contains a rotary encoder that can provide the human inspector with information and/or displays of the position and angle of the probe as well as the ultrasonic signal as the probe is rotated around the flush fastener heads.

And in the case of flush fastener inspections, the probe guide can be equipped with either a transparent window or camera to aid the human inspector always position the probe guide directly over the flush fastener as the probe is rotated around the flush fastener heads

DETAILED DESCRIPTION

The objective of the work disclosed herein is to develop nondestructive inspection (NDI) capabilities for the detection of fatigue cracks extending from fastener holes in multi-layered metallic structures without removing the fastener. There may be two different types of these structures, one with raised head fasteners (usually internal) and one with flush fasteners (aircraft skin). The proposed solution for inspecting fastener hole locations involves the use of ultrasonic testing (UT).

Figure 2:
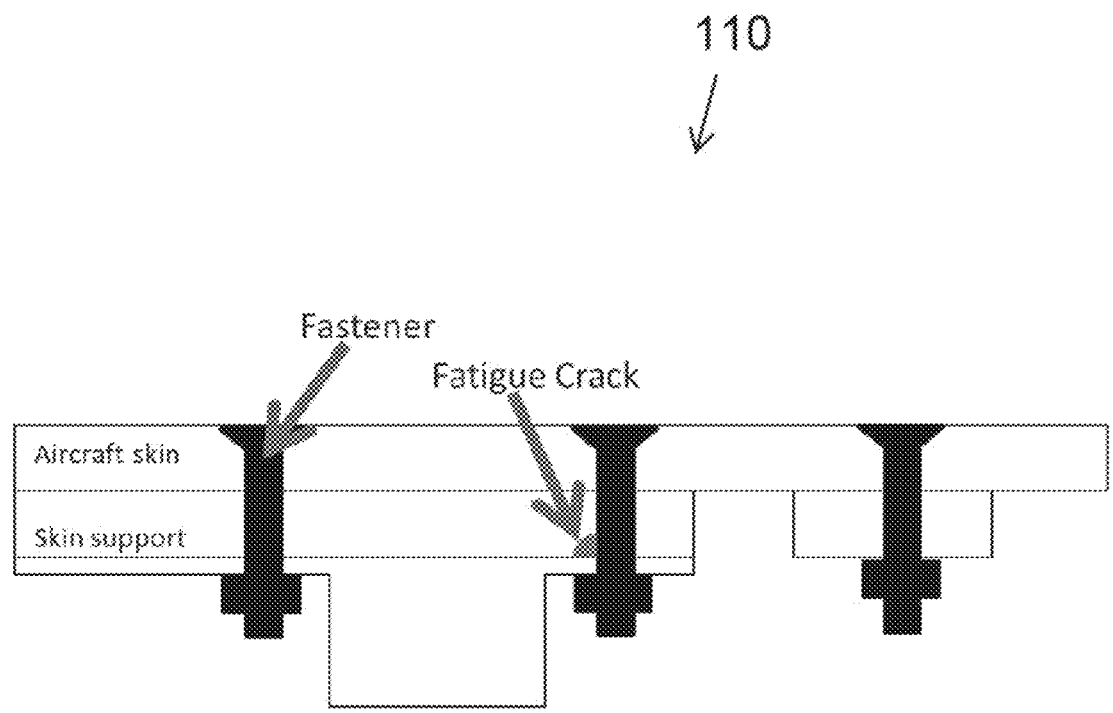
FIG. 2 is an example schematic of flushed head fasteners in multilayered wing structure with a fatigue crack.

Turning first to FIG. 1, shown generally as 100, is a schematic of raised head fasteners in one possible structure—a multilayered wing structure with a fatigue crack. And in FIG. 2, shown generally as 110, is a schematic of flush fasteners which may be more prevalent on, for example, aircraft skins. A possible fatigue crack is also shown. Although wing structures are shown as examples, any multilayered metallic structure with fasteners could be inspected.

In order to maximize the signal that is reflected from a fatigue crack at a certain depth (specific layer) or around a specific sized fastener, the UT transducer needs to be located at a specific location on the surface of the part. A fatigue crack can also be located at any direction (360° rotation) around the fastener. In order to help inspectors locate fatigue cracks and provide feedback at what angle the crack is located we disclose a probe housing that will help the inspector position the probe at the correct location relative to the fastener and provide feedback about what angle the probe is currently at relative to a starting location.

In order to provide rotational position feedback to the inspectors we propose herein two sensors which can be put in a probe guide, either an inertial measurement unit (IMU) or a rotary encoder. Both of these sensors could be used for the structure with the raised fastener heads (FIG. 1) or the structure with flush fasteners (FIG. 2). The probe housing would have to be different for each sensor type and for the type of structure to be inspected.

Figure 3:
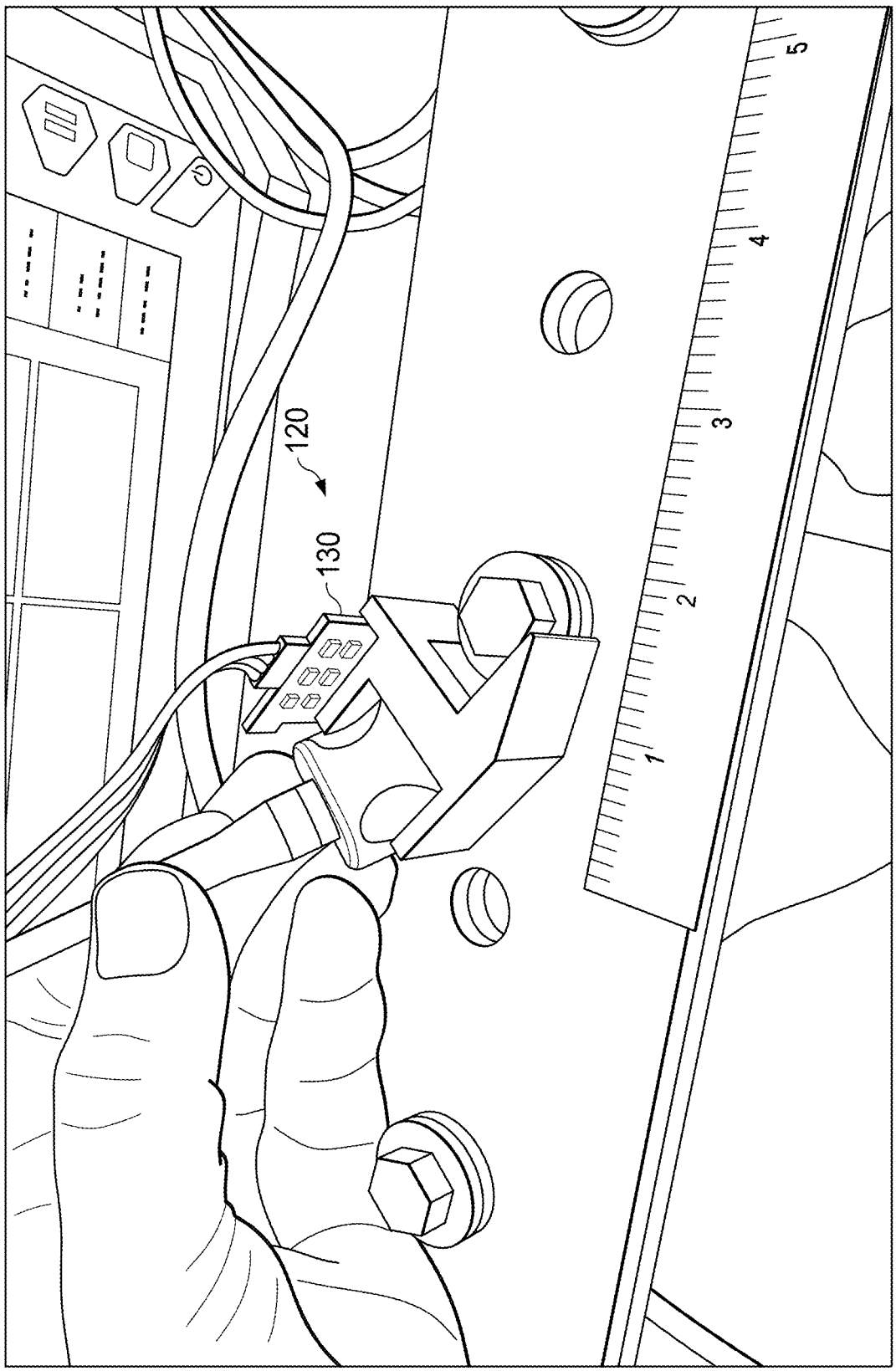
FIG. 3 is an example image of a prototype probe guide for the inspection of a structure with raised fastener heads along with an inertial measurement unit—all in a 3 layer specimen stack-up in this example.
Figure 4:
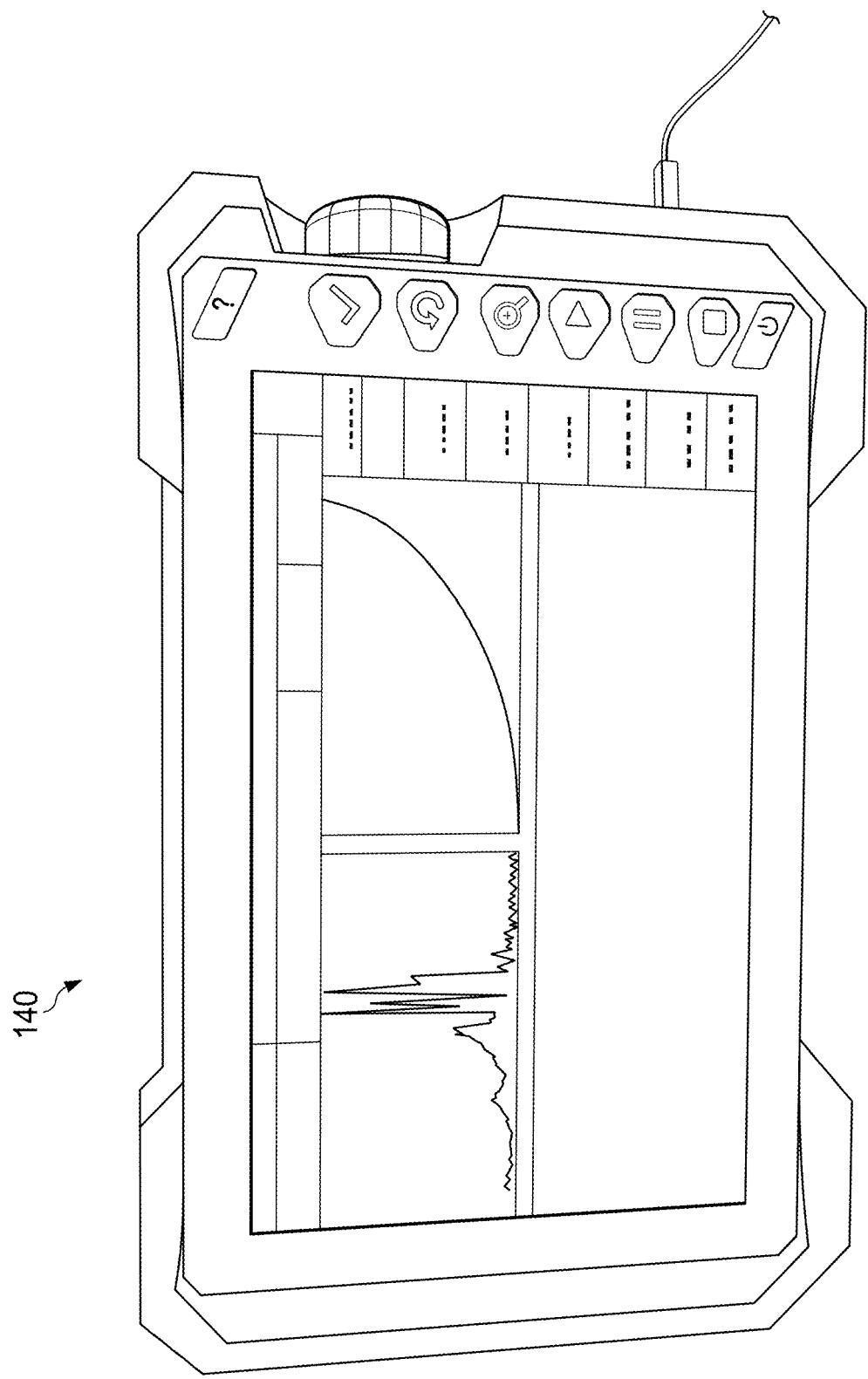
FIG. 4 is an example of recording the output—in this case on an Olympus X3 inspection unit. Other inspection and recording devices may be used.

An image of one of the prototype probe guides 120 for the inspection of a structure with raised fastener heads along with an inertial measurement unit (IMU) 130 is shown in FIG. 3. IMU's provide an angular position measured in degrees to the user which can be used in a variety of ways. In FIG. 3 the IMU output is fed through an Arduino, which converts the amount of rotation to electrical pulses, which are passed to (in this example) an Olympus X3 inspection unit, illustrated in FIG. 4 as 140. This allows the X3 to calculate the position of the probe and display the current angle on the screen. The current angle of the probe is seen in the top display box of the X3 on the right-hand side, while the bottom section of the display fills with a 360° view of the ultrasonic signal collected.

Figure 5:
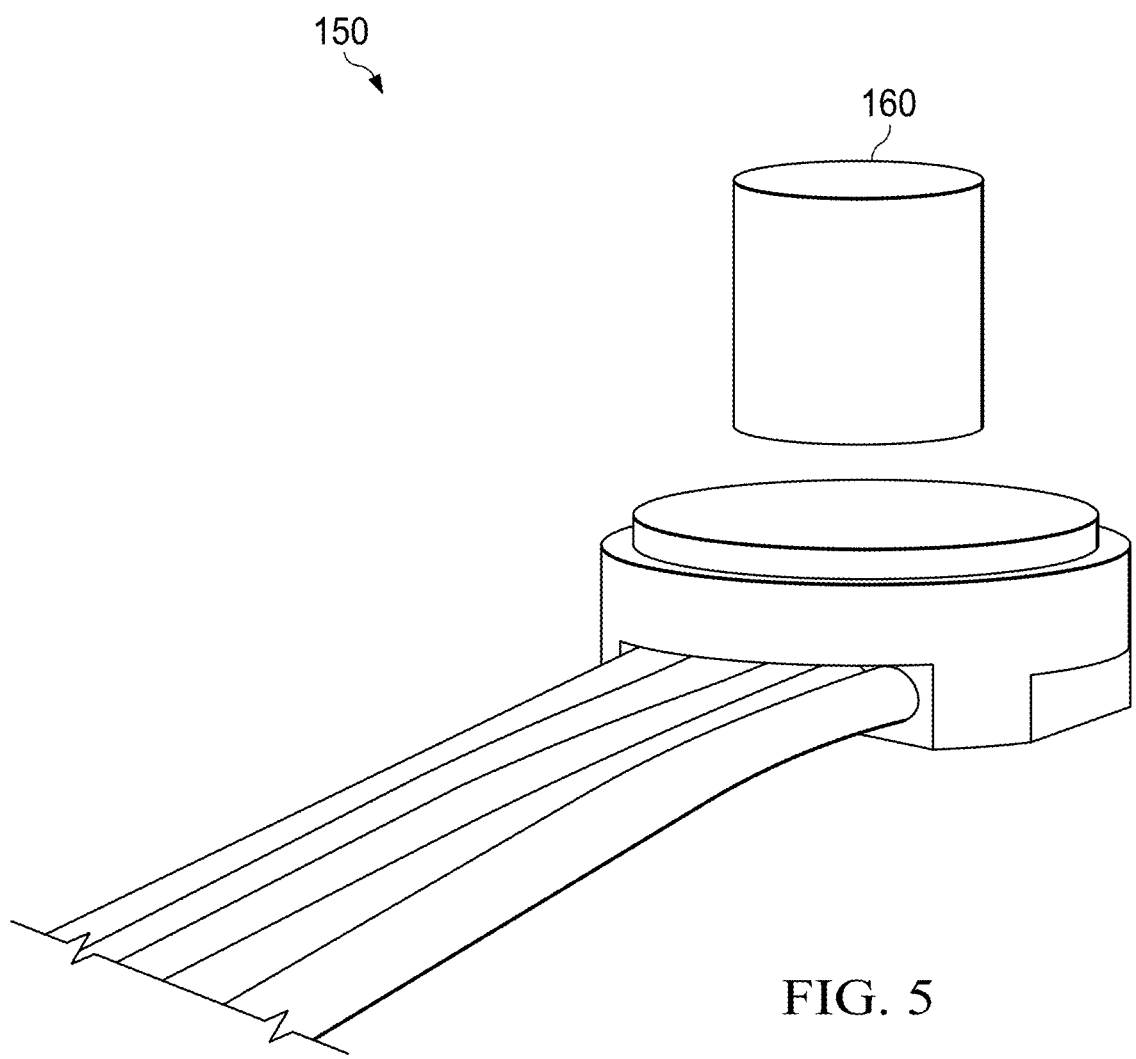
FIG. 5 is an example of an alternate embodiment for collecting rotational data—that is the use of a rotary encoder instead of an inertial measurement unit.

The second sensor option to collect rotation data is to use a rotary encoder instead of an inertial measurement unit. An image of one possible rotary encoder is shown in FIG. 5, shown generally as 150. As the magnet 160 rotates, its effect on the circuit below is recorded and output. This information would then be used for the same purpose as the inertial measurement unit (IMU) embodiment, to help the inspector know where their probe is at currently around the fastener site under inspection. The cylindrical magnet would be placed in a "cap" piece, 170 seen in the left part of FIG. 6. The cap is then held in place with one hand while the inspector's other hand rotates the housing holding the probe around the bolt.

Figure 7:
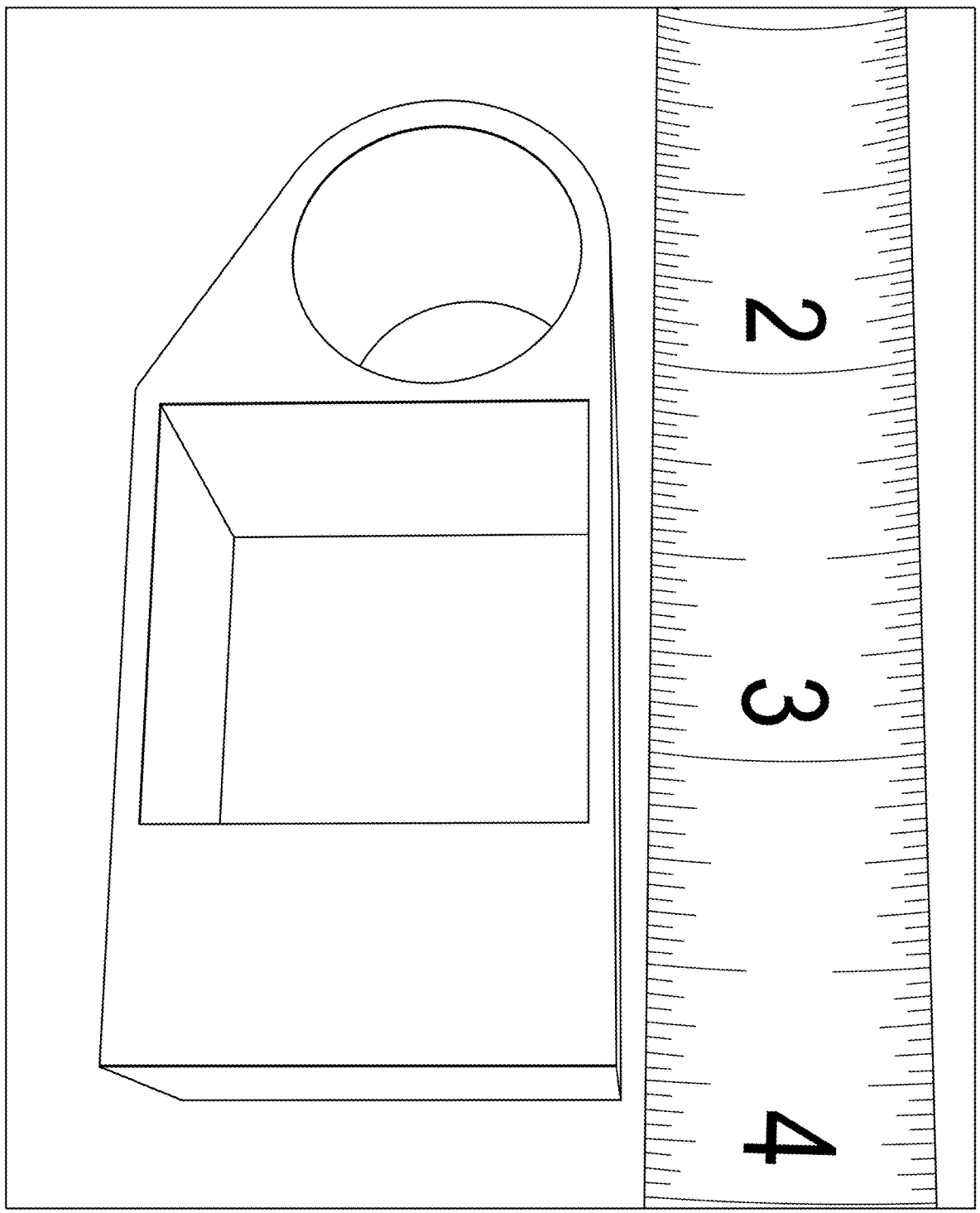
FIG. 7 is an example underside of the probe guide prototype (rotary encoder) of FIG. 6 for the inspection of raised head fastener sites.

A rotary encoder option requires two hands to operate, as the inspector would have to hold the "cap" containing the magnet stable while rotating the probe guide. In addition, the part of the probe housing with the magnet must sit directly over the faster as the magnet and sensor need to be at the center of rotation. For multi-layered structures with raised fastener heads, this means that the probe guide with a rotary encoder occupies more space compared to the IMU embodiment, as extra material needs to be present to hold the encoder above the fastener and help the guide center on the fastener. For the rotary encoder embodiment prototype that is shown in FIG. 7 a hole on the bottom of the probe guide sits over the raised head fastener. Since there are different styles and sizes for raised head fasteners it would be likely that there would have to be different embodiments for different examples.

Figure 8:
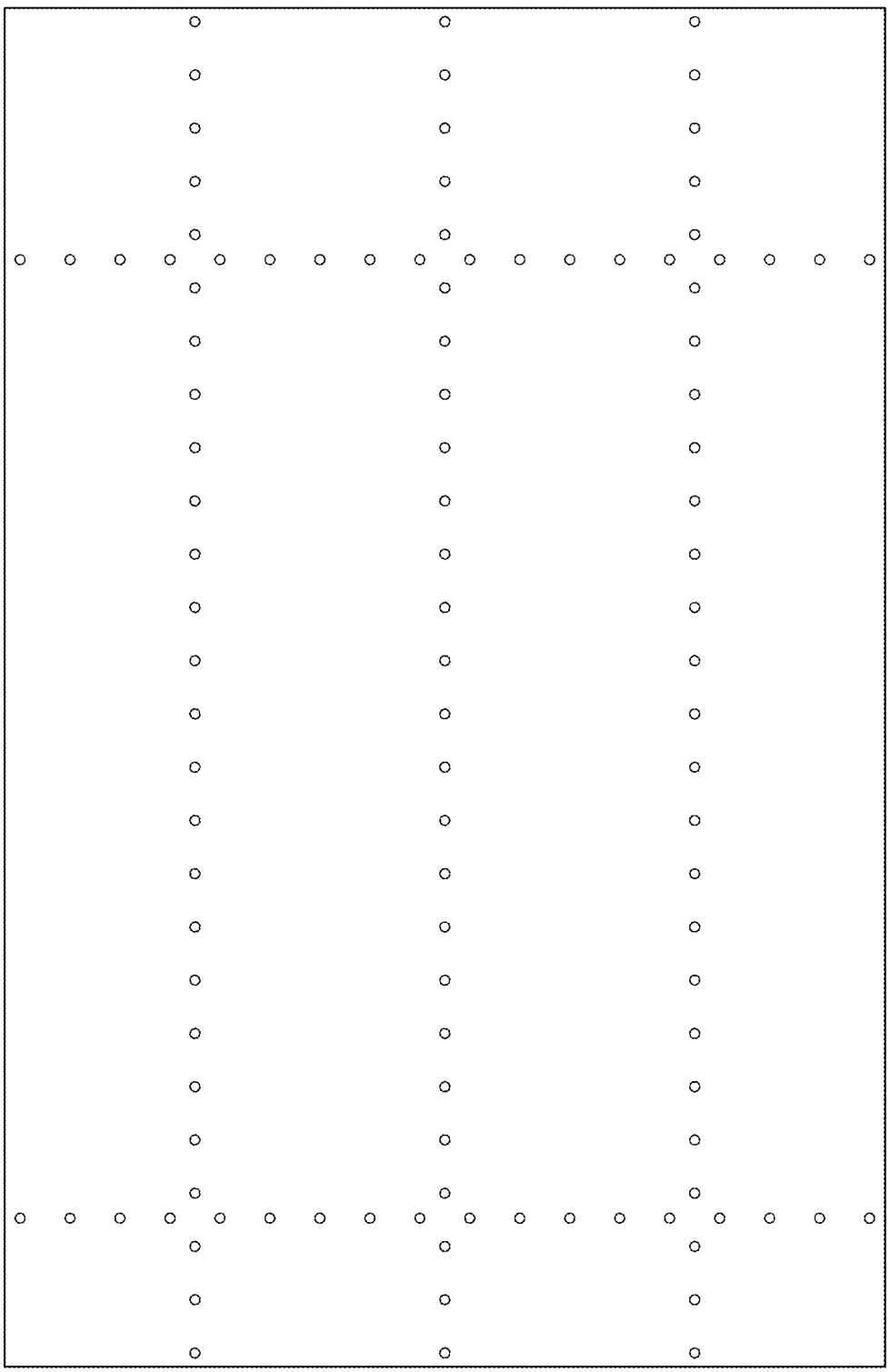
FIG. 8 is an example of another type of structure that often needs inspection—a multilayered site with either flush fastener heads or rivets. Often seen on the external skin of aircraft.
Figure 9:
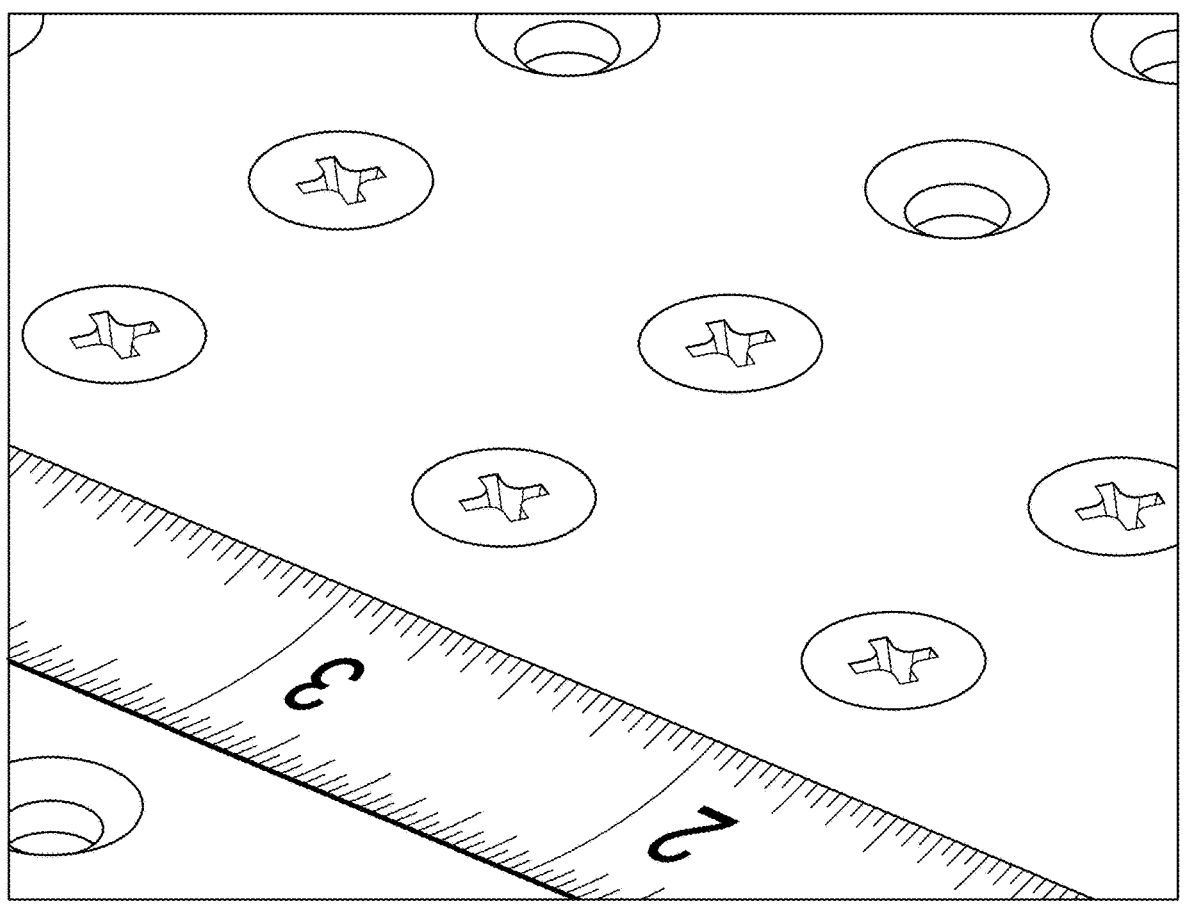
FIG. 9 is an example of a mock-up panel with countersunk fasteners for testing the external skin such as those of FIG. 8.

The other structure that may be required to be inspected is a multi-layered site with either flush fastener heads as seen in FIG. 2 or rivets. This type of structure is likely to be seen on the skin of aircrafts. Since this type of structure is on the surface of the aircraft there are much fewer space restrictions. An image of flush countersunk fasteners on an aircraft fuselage is shown in FIG. 8, and a small mock-up for testing purposes is shown in FIG. 9.

Figure 10:
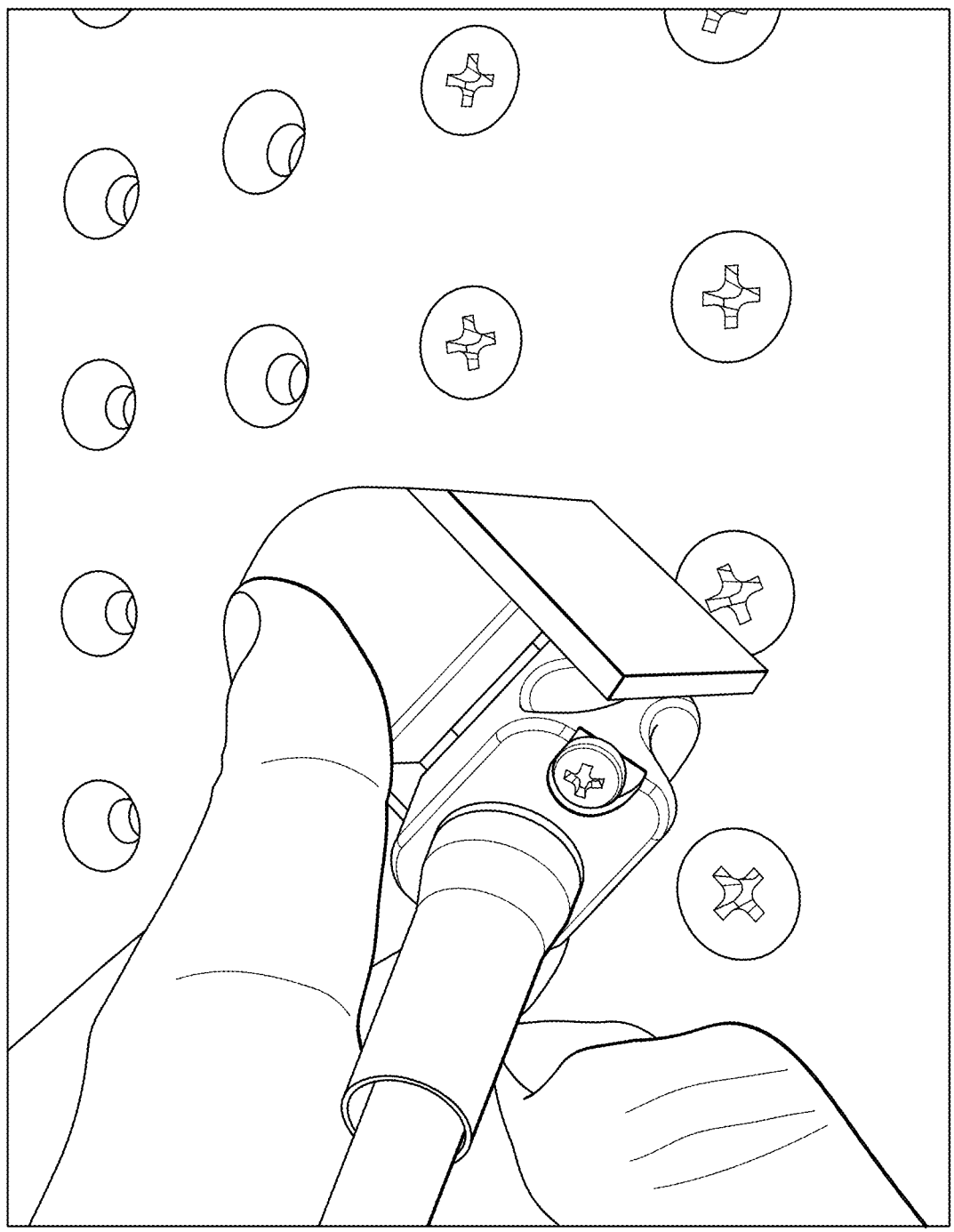
FIG. 10 is an example prototype probe housing with a transparent window to view the fastener site being inspected.
Figure 11:
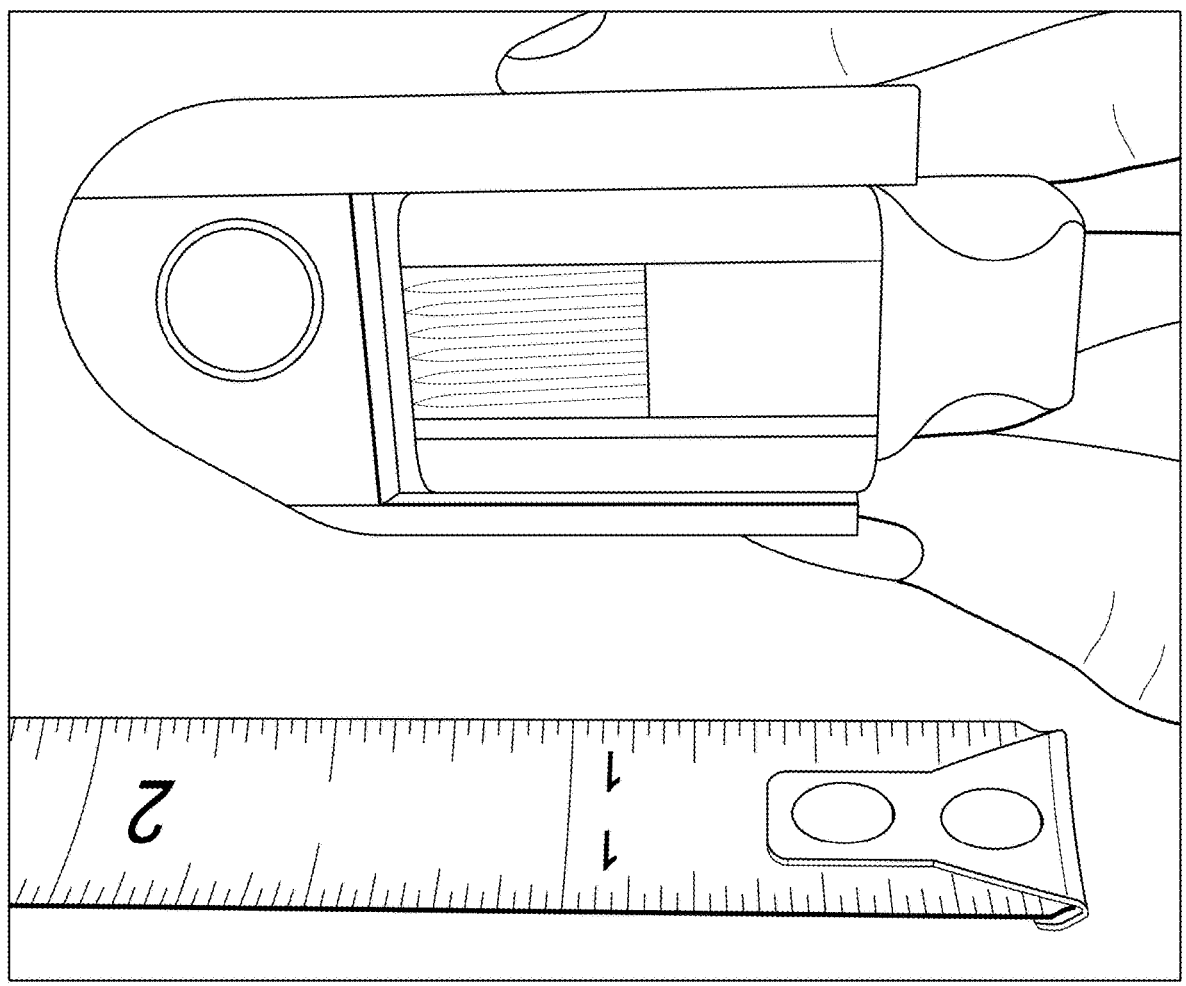
FIG. 11 illustrates the bottom side of the prototype probe housing with a transparent window to view the fastener site being inspected.

In order to inspect these multi-layered structures from the external part of the aircraft skin an alternate embodiment is proposed. Since there are fewer space restrictions, this probe guide would sit directly over the fastener and use that to guide the UT transducer into the correct location for inspection. This probe guide will also likely include either a transparent window or a camera to help the inspector position the probe guide correctly over the fastener. An illustrative prototype is shown in FIG. 10. In the prototype the partially transparent area in the middle of the guide represents the location of a window that the inspector can use to help center the probe guide on the fastener. This prototype also includes a small protrusion on the bottom of the window to help center the probe in the drive groove of the fastener. FIG. 11 illustrates the bottom side of the FIG. 10 embodiment with a transparent window showing the small protrusion (circled in red) to enable centering the guide on the fastener.

Figure 6:
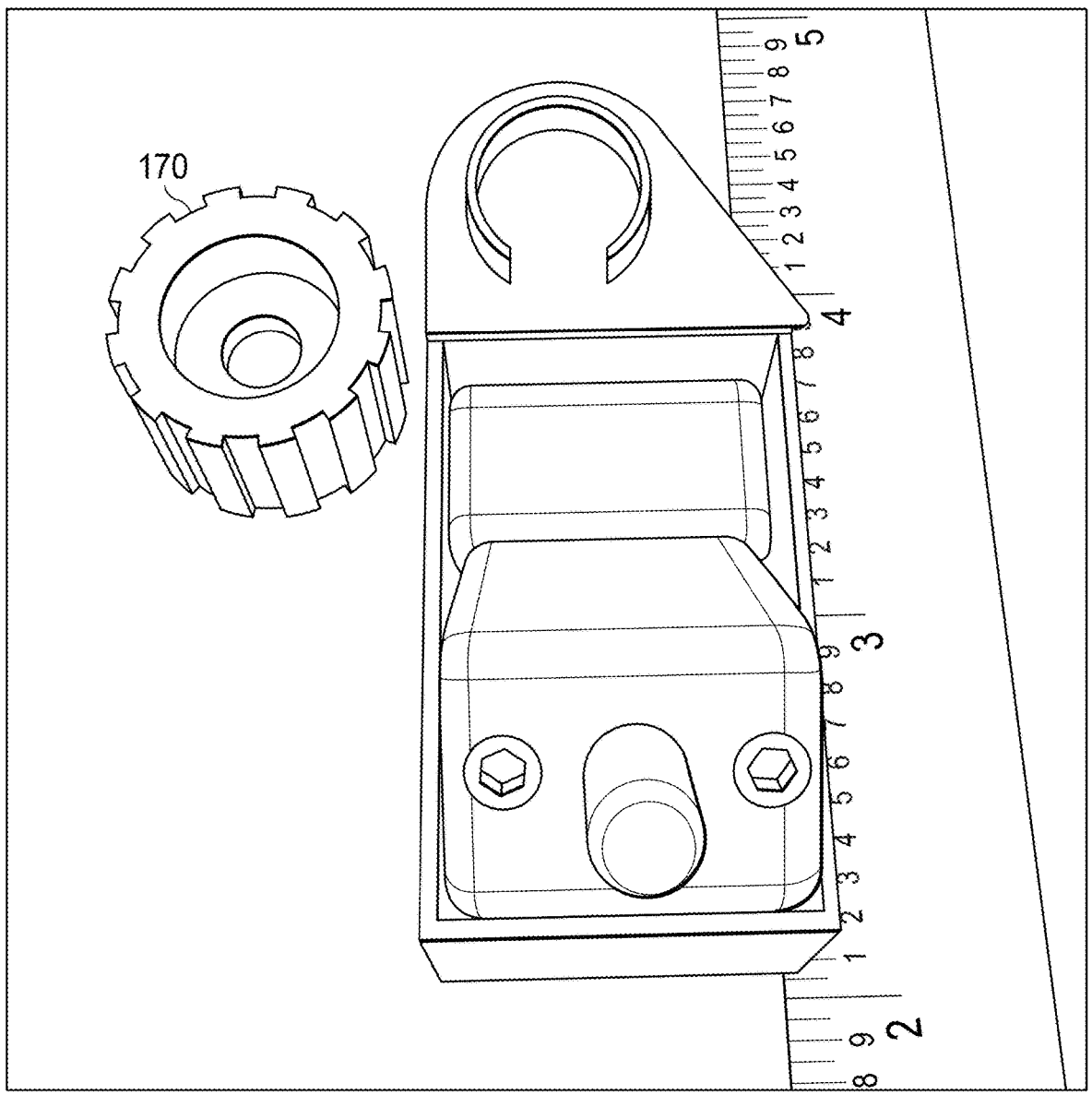
FIG. 6 is an example prototype rotary encoder embodiment probe guide.

This embodiment could also use the rotary encoder that is shown in FIG. 5 and a probe guide that is similar to the embodiment shown in FIG. 6 and FIG. 7 with a small protrusion to help center the probe on the fastener and a window similar to the inertial measurement unit embodiment shown in FIG. 10 and FIG. 11 below. This embodiment for the inspection of flush fasteners would also require two hands to operate.

Although certain embodiments and their advantages have been described herein in detail, various changes, substitutions, and alterations could be made without departing from the coverage. Moreover, the potential applications of the disclosed techniques are not intended to be limited to the embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized.

The invention claimed is:

1. A method for detecting fatigue cracks extending from fastener holes in multilayer metallic structures without removing the fasteners, wherein the fasteners have fastener heads, comprising the steps of:
    a) providing a probe guide to be used by a human inspector;
    b) wherein the probe guide includes an ultrasonic testing (UT) sensor;
    c) wherein the probe guide can be used by the human inspector to locate the ultrasonic testing sensor at specific selected locations on the surface of the multilayer metallic structures;
    d) wherein the probe guide can be positioned against selected fastener heads and rotated around the selected fastener head by the human inspector; and
    e) wherein the probe guide contains an inertial measurement unit (IMU) or a rotary encoder that provides the human inspector with information or displays of the rotational position and angle of the probe as well as the ultrasonic signal as the probe is rotated around the fastener head.

2. The method for detecting fatigue cracks extending from fastener holes in multilayer metallic structures without removing the fasteners of claim 1,
    a) wherein the fasteners have raised fastener heads;
    b) and wherein the probe guide can be positioned against the selected raised fastener heads head and rotated around the selected raised fastener head by the human inspector; and
    c) wherein the probe guide contains an inertial measurement unit (IMU) that providesthe human inspector with information or displays of the rotational position and angle of the probe as well as the ultrasonic signal as the probe is rotated around the selected raised fastener head.

3. The method for detecting fatigue cracks extending from fastener holes in multilayer metallic structures without removing the fasteners of claim 1,
    a) wherein the fasteners have raised fastener heads;
    b) and wherein the probe guide can be positioned against the selected raised fastener heads head and rotated around the selected raised fastener head by the human inspector; and
    c) wherein the probe guide contains a rotary encoder that provides the human inspector with information or displays of the rotational position and angle of the probe as well as the ultrasonic signal as the probe is rotated around the selected raised fastener head.

4. The method for detecting fatigue cracks extending from fastener holes in multilayer metallic structures without removing the fasteners of claim 1,
    a) wherein the fasteners have flush fastener heads;
    b) wherein the probe guide can be positioned directly over the selected flush fastener head and rotated around the selected flush fastener head by the human inspector; and
    c) wherein the probe guide contains an inertial measurement unit (IMU) that provides the human inspector with information or displays of the rotational position and angle of the probe as well as the ultrasonic signal as the probe is rotated around the selected flush fastener head.

5. The method for detecting fatigue cracks extending from fastener holes in multilayer metallic structures without removing the fasteners of claim 4 wherein the probe guide includes either a transparent window or camera to help the human inspector position the probe guide directly over the flush fastener.

6. The method for detecting fatigue cracks extending from fastener holes in multilayer metallic structures without removing the fasteners of claim 1,
    a) wherein the fasteners have flush fastener heads;
    b) wherein the probe guide can be positioned directly over the selected flush fastener head and rotated around the selected flush fastener head by the human inspector;
    c) and wherein the probe guide contains a rotary encoder that provides the human inspector with information or displays of the rotational position and angle of the probe as well as the ultrasonic signal as the probe is rotated around the selected flush fastener head.

7. The method for detecting fatigue cracks extending from fastener holes in multilayer metallic structures without removing the fasteners of claim 6 wherein the probe guide includes either a transparent window or camera to help the human inspector position the probe guide directly over the flush fastener.

* * * * *

UNITED STATES PATENT AND TRADEMARK OFFICE
CERTIFICATE OF CORRECTION

| | | |
|---|---|---|
| PATENT NO. | : 12,411,113 B2 | Page 1 of 1 |
| APPLICATION NO. | : 17/966872 | |
| DATED | : September 9, 2025 | |
| INVENTOR(S) | : John Nagel et al. | |

It is certified that error appears in the above-identified patent and that said Letters Patent is hereby corrected as shown below:

In the Specification

1. In Column 1, Line 67, delete "located" and insert -- located at --, therefor.
2. In Column 2, Line 5, delete "a a" and insert -- a --, therefor.
3. In Column 3, Line 13, delete "structures" and insert -- structures that --, therefor.
4. In Column 3, Line 33, delete "heads" and insert -- heads. --, therefor.

In the Claims

5. In Column 5, Line 56, in Claim 2, delete "and wherein" and insert -- wherein --, therefor.
6. In Column 5, Line 57, in Claim 2, delete "heads head" and insert -- head --, therefor.
7. In Column 6, Line 2, in Claim 2, delete "providesthe" and insert -- provides the --, therefor.
8. In Column 6, Line 11, in Claim 3, delete "and wherein" and insert -- wherein --, therefor.
9. In Column 6, Line 12, in Claim 3, delete "heads head" and insert -- head --, therefor.
10. In Column 6, Line 46, in Claim 6, delete "inspector;" and insert -- inspector; and --, therefor.
11. In Column 6, Line 47, in Claim 6, delete "and wherein" and insert -- wherein --, therefor.

Signed and Sealed this
Eleventh Day of November, 2025

John A. Squires
*Director of the United States Patent and Trademark Office*